United States Patent [19]

Thro

[11] Patent Number: 4,670,906
[45] Date of Patent: Jun. 2, 1987

[54] DATA COMMUNICATIONS SYSTEM TRANSMITTER SELECTION METHOD AND APPARATUS

[75] Inventor: Stuart W. Thro, Cary, Ill.

[73] Assignee: Motorola, Inc., Schaumburg, Ill.

[21] Appl. No.: 894,084

[22] Filed: Aug. 6, 1986

Related U.S. Application Data

[63] Continuation of Ser. No. 847,100, Apr. 2, 1986, abandoned, which is a continuation of Ser. No. 603,399, Apr. 24, 1984, abandoned.

[51] Int. Cl.$^4$ .......................... H04B 1/00; H04B 7/00
[52] U.S. Cl. .......................................... 455/56; 455/33
[58] Field of Search ............................. 455/33, 52–54, 455/56, 62; 179/2 EB

[56] References Cited

U.S. PATENT DOCUMENTS

| | | | |
|---|---|---|---|
| 4,092,600 | 5/1978 | Zimmermann et al. | 455/33 |
| 4,144,412 | 3/1979 | Ito et al. | 455/56 |
| 4,481,670 | 11/1984 | Freeburg | 455/56 |
| 4,485,486 | 11/1984 | Webb et al. | 455/56 |

*Primary Examiner*—Jin F. Ng
*Attorney, Agent, or Firm*—Rolland R. Hackbart

[57] ABSTRACT

A data communications system is described which comprises a general communications controller (GCC), a plurality of channel communications modules (CCM) and associated co-located transmitters and receivers, and a plurality of portable radios. Message signals carrying alphanumeric information are communicated between the GCC and the portable radios by way of a radio channel. Each CCM receiver takes a signal strength measurement every time it receives a message signal from a portable radio. The GCC gathers the signal strength measurements from the GCC receivers receiving the same message signal and computes the radio channel path loss between the portable radio and each base/transmitter-receiver site which received that portable radio's message. The GCC next determines how much transmitter power each base transmitter site can deliver to the portable radio's receiver. The GCC can then determined (a) which sites are capable of delivering a message to the portable radio, and (b) which sites can be simultaneously used for other traffic without producing harmful interference to the first transmission. Since the GCC can manage the levels of co-channel interference, multiple messages may be simultaneously sent from several base transmitters to several portable radios. This mode of system operation provides for greatly enhanced information throughput.

27 Claims, 9 Drawing Figures

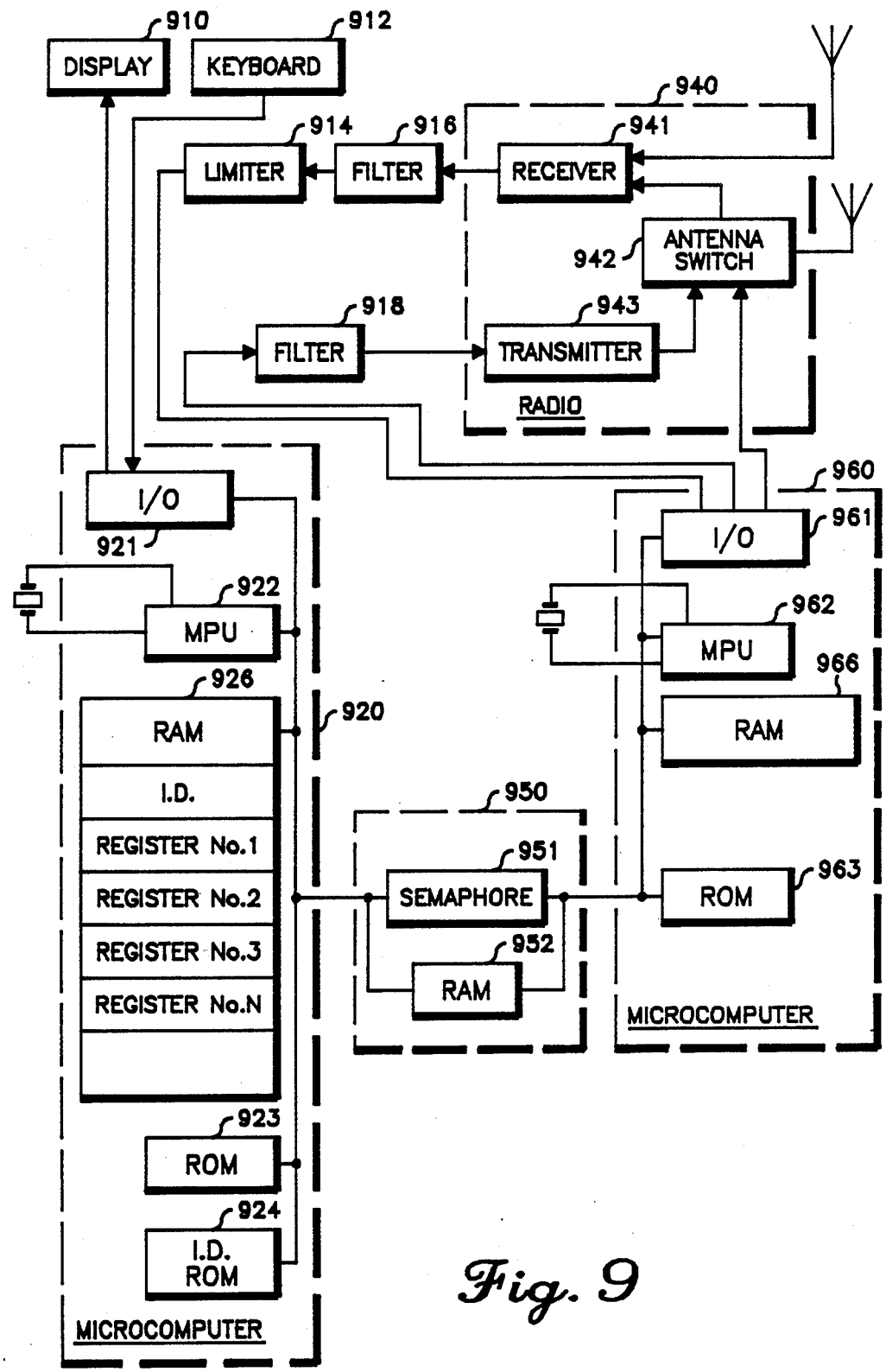

DATA COMMUNICATIONS SYSTEM TRANSMITTER SELECTION METHOD AND APPARATUS

This is a continuation of Ser. No. 847,100, filed Apr. 2, 1986 and now abandoned, which in turn is a continuation of Ser. No. 603,399, filed Apr. 24, 1984 and now abandoned.

RELATED PATENT APPLICATION

The present invention is related to the instant assignee's U.S. patent application, Ser. No. 441,329, (now U.S. Pat. No. 4,481,670), filed Nov. 12, 1982, entitled "Method and Apparatus For Dynamically Selecting Transmitters For Communications Between A Primary Station And Remote Stations Of A Data Communications System" and invented by Thomas A. Freeburg, which application is incorporated herein by reference.

BACKGROUND OF THE INVENTION

The present invention relates generally to radio communications systems, and more particularly to an improved method and apparatus for dynamically selecting one of a plurality of radio frequency signal transmitters for transmitting message signals from a primary station to remote stations of a data communications system.

In radio communications systems covering larger geographical areas than can be adequately covered with a single radio frequency signal transmitter, a selection scheme must be used to insure that the transmitter selected will provide good quality communications to the desired remote station.

The problem of selecting which of several possible radio transmitters should be used to respond to a remote station has been solved with a limited degree of success in several different ways. According to one technique, the radio receiver receiving the strongest RF signal from a selected remote station is used to define the approximate location of that remote station. The primary station simply selects the radio transmitter covering the geographical area of the receiver receiving the strongest signal from the selected remote station.

According to another technique, each remote station is permanently assigned to a specific geographical area including one or more zones covered by a specific radio transmitter. This technique works reasonably well as long as the remote station remains within the geographical area covered by the assigned radio transmitter. However, this technique is inadequate for communications systems where each remote station is free to move about throughout a very large geographical area, making it impossible to limit a remote station to the coverage area of a single radio transmitter.

According to yet another technique that is utilized in cellular radiotelephone systems, the remote station determines the zone in which it is located by selecting the radio transmitter having the largest signal strength. This technique requires that each radio transmitter have a different frequency, and that communications from the primary station to a selected remote station be sent in all zones in order for the remote station to make its choice known on demand. This technique is adequate for radiotelephone systems where the average message length is much longer than the setup message length, but is inadequate for data communications sytems where the average message length is not much larger than the set up message length. Therefore, in order to provide good quality communications in data communications systems, it is necessary to determine the location of each remote station in the system and frequently update such as remote stations move about.

OBJECTS AND SUMMARY OF THE INVENTION

It is an object of the present invention to provide an improved method and apparatus for dynamically selecting one or a group of a plurality of radio frequency signal transmitters for transmitting message signals from a primary station to a target remote station of a data communications system.

It is yet a further object of the present invention to provide an improved method and apparatus to determine for each primary station to remote station transmission which of the transmitters may be simultaneously used for independent message traffic without interfering with communications currently in progress.

Briefly described, the present invention encompasses a method for use in a primary station of a data communications system for communicating message signals via a communications medium such as a radio channel between the primary station and a plurality of remote stations, such as portable and mobile radios located anywhere in a large geographical area. The primary station further includes a communications controller and a plurality of base stations each including a transmitter for transmitting signals modulated on a first carrier signal of the radio channel and a receiver colocated with the transmitter for receiving signals modulated on a second carrier signal of the radio channel. The remote stations each further include a transmitter for transmitting signals modulated on the second carrier signal and a receiver for receiving signals modulated on the first carrier signal. The method of the present invention enables the communications controller to select one or a group of the base station transmitters for transmitting signals from the primary station to selected remote stations. The novel method practiced by the communications controller comprises the steps of measuring the signal strength of the carrier signal received by any base station receiver during each transmission from a target remote station; computing the path loss between the target remote station and each base station site using the measured signal strength for the receiver at that site; computing the signal strength receivable at the target remote station from each base station transmitter using the computed path loss for the base station receiver colocated with that base station transmitter; and selecting at least one of the base station transmitters for transmitting a message signal to the target remote station. The unique transmitter selection method may specify use of the base station transmitters which are capable of delivering the strongest signal to the target remote station or at least an adequate signal for reliable data communications using interference and site prioritization criteria. The communications controller may include apparatus such as a computer or microcomputer that is suitably programmed to execute each step of the transmitter selection method.

According to another feature of the present invention, the communications controller may further determine which of the non-selected base station transmitters must be inhibited to prevent interference with the desired signal being sent to the target remote station. According to yet a further feature of the present invention, the communications controller can simultaneously transmit message signals to two or more remote stations when these signals can be delivered from different base station transmitter sites and when the interference level resulting from the co-channel transmissions is not excessive.

BRIEF DESCRIPTION OF THE DRAWINGS

FIG. 9 is a block diagram of the circuitry in the portable radios in FIG. 1.

DETAILED DESCRIPTION OF THE PREFERRED EMBODIMENTS

Figure 1:
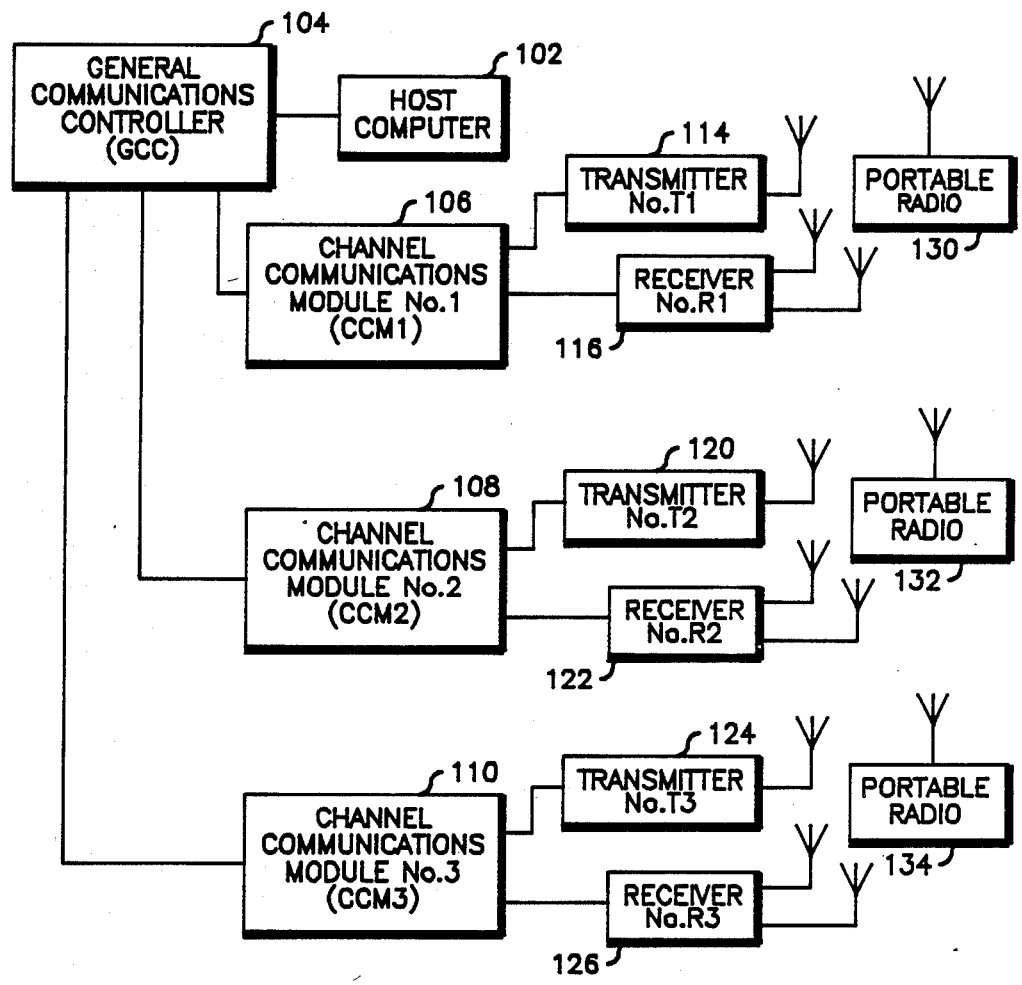
FIG. 1 is a block diagram of a data communications system that may advantageously utilize the present invention.

In FIG. 1, there is illustrated a data communications system that communicates message signals between a primary station, such as a general communications controller (GCC) 104, by way of a communications medium such as a radio frequency (RF) communications channel to a plurality of remote stations, such as portable radios 130, 132 and 134. Although described in the context of a data only communications system, both data signals and analog signals such as voice signals can be communicated over the RF communications channel to the portable radios 130, 132 and 134. Since the data communications system covers a larger geographical area than can be covered with a single base station site, there is a need for a plurality of such sites. Located throughout the geographical area are a number of base station sites each including a channel communications module (CCM) 106, 108 and 110, an RF signal transmitter 114, 120, and 124 and an RF signal receiver 116, 122 and 126, respectively. These transmitter/receiver pairs 114 & 116, 120 & 122 and 124 & 126 may operate on separate or the same antenna systems located therewith.

The RF communications channel is preferably comprised of first and second carrier signals which may be modulated with the message signals. Transmitters 114, 120 and 124 may be operative on the first carrier signal, while receivers 116, 122 and 126 may be operative on the second carrier signal of the radio communications channel. Transmitters 114, 120 and 124 and receivers 116, 120 and 126 may be any suitable commercially available transmitters and receivers such as those described in Motorola Instruction Manual 68P81013E65, 68P81060E30 or 68P81049E45. CCM's 106, 108 and 110 are typically colocated with their corresponding transmitters and receivers and may be of the type shown and described in Motorola manual no. 68P81063E30.

Portable radios 130, 132 and 134 are preferably portable radios of the type shown and described in Motorola manual no. 68P81035C35, or may be commercially available mobile radios of the type shown and described in Motorola instruction manual no. 68P81039E25 or commercially available hand-held portable radios of the type shown and described in U.S. Pat. No. 3,906,166 and 3,962,553 and in patent application Ser. No. 187,304, (now U.S. Pat. No. 4,486,624) entitled "Microprocessor Controlled Radio-telephone Transceiver", filed Sept. 15, 1980 and invented by Larry C. Puhl et al (all incorporated herein by reference). Portable radios 130, 132 and 134 each include a transmitter operable on the second carrier signal and a receiver operable on the first carrier signal. The transmitter and receiver in portable radios 30, 132 and 134 may be any suitable commercially available conventional transmitter and receiver, such as, for example, the transmitter and receiver described in Motorola instruction manual no's. 68P81035C35, 8P81039E25 and 68P81014C65. These and the aforementioned Motorola Instruction Manuals are incorporated herein by reference and may be obtained from the Service Publications Department of Motorola, Inc., 1301 East Algonquin Road, Schaumburg, Ill. or from Motorola C & E Parts, 1313 East Algonquin Road, Schaumburg, Ill.

GCC 104 of the data communications system in FIG. 1 may be coupled to a host computer 102 which may control a number of GCC's 104 that are located in different geographical areas, such as, for example, different cities. Thus, host computer 102 may gather data from, and dispatch data to portable radios located in several different cities. GCC 104 may be coupled to host computer 102 and CCM's 106, 108 and 110 by means of commercially available modems and associated dedicated telephone lines.

GCC 104 in FIG. 1 transmits message signals to and receives message signals from portable radios 130, 132 and 134. The message signals may include coded data packets which each may contain a binary preamble, a predetermined synchronization word and an information word containing a command, status or data. The format of the data packets is preferably that described in the instant assignee's U.S. patent applications Ser. No. 402,682, entitled "Data Signalling System", filed Jul. 28, 1982 and invented by Timothy M. Burke et al.; Ser. No. 512,801, (now U.S. Pat. No. 4,519,068) entitled "Method and Apparatus For Communicating Variable Length Messages", filed Jul. 11, 1983 and invented by Jay Krebs et al.; and in Ser. No. 512,800, (now U.S. Pat. No. 4,517,669) entitled "Method and Apparatus For Coding Messages Communicated Between A Primary Station and Remote Stations Of A Data Communications System", filed Jul. 11, 1983 and invented by Thomas A. Freeburg et al., all incorporated herein by reference. Other suitable data formats may be any of a number of existing data formats, such as, for example, those described in U.S. Pat. Nos. 3,906,445, 4,156,867 and 4,354,252, all incorporated herein by reference.

Message signals are routed by GCC 104 to a selected CCM 106, 108 and 110 for transmission by its corresponding transmitter. Since the message signals may be transmitted on one or several transmitters simultaneously, as in simulcast systems of the type described in U.S. Pat. No. 4,188,582, it is necessary that GCC 104 have a means for determining which of the base station transmitters 114, 120, or 124 should be used to deliver message signals to selected portable radios 130, 132 or 134. The improved method and apparatus of the present invention enables the GCC 104 to dynamically make these message routing decisions.

According to an important feature of the present invention, two or more of the transmitters 114, 120, or 124 can be operated simultaneously for communicating with different portable radios provided that transmissions from the interfering transmitters do not interfere with reception by each portable radio receiver of its desired signal. As a result, data throughput of the data communications system illustrated in FIG. 1 can be significantly increased by re-use of the RF communications channel. In other words, by taking advantage of re-use, a single RF communications channel can serve thousands of portable radios in a geographical area covering several states and their major cities.

Figure 2:
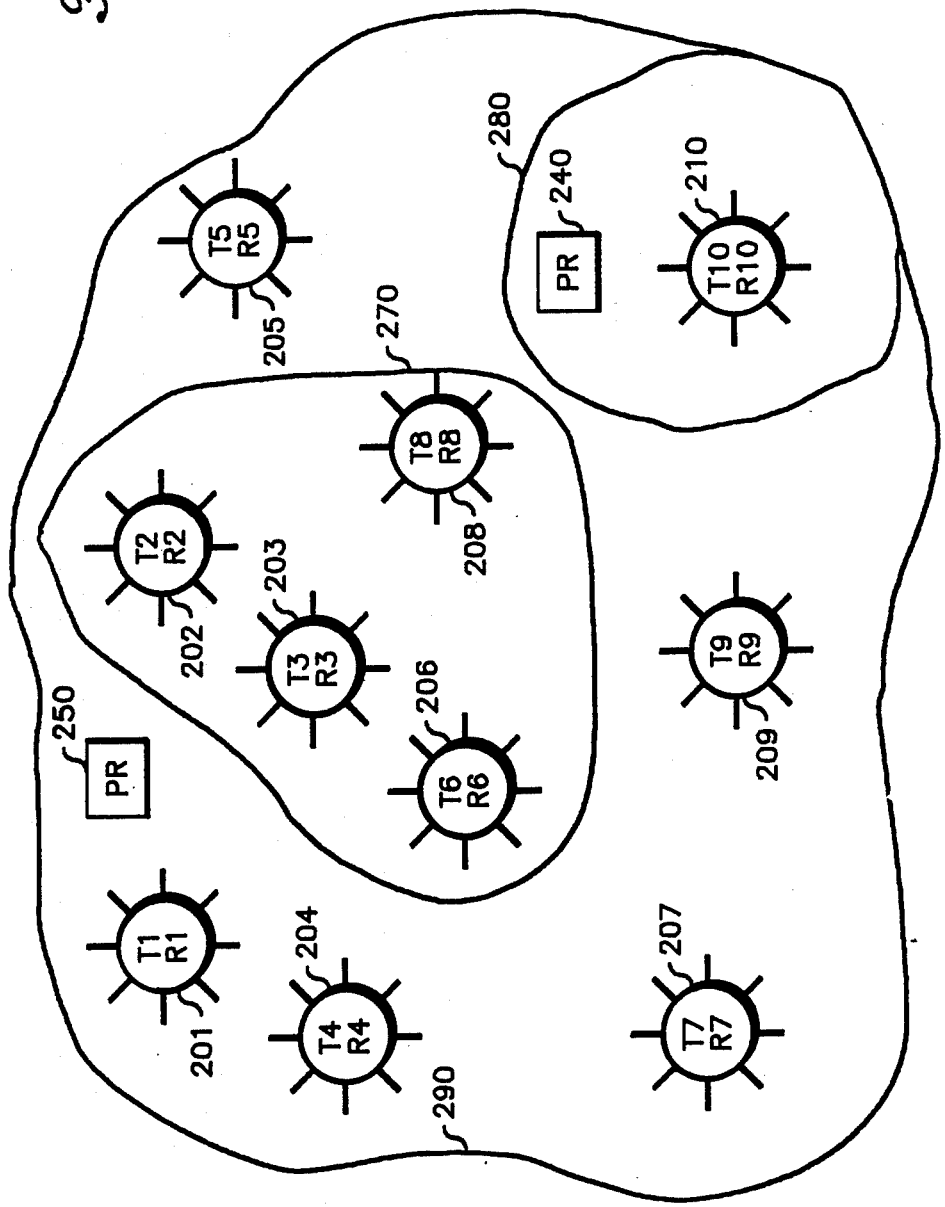
FIG. 2 is a diagram of a geographic area covered by ten base stations.

Referring to FIG. 2, there is illustrated a geographical area 290 of a data communications system that includes ten base station sites 201-210 and corresponding colocated transmitters T1-T10 and receivers R1-R10. Also shown are two portable radios 240 and 250. Each time a portable radio transmits, signal strength readings are taken by receivers R1-R10. These signal strength readings are transferred by the CCM's for each site 201-210 to GCC 104.

According to the present invention, the signal strength readings SSI taken by receivers R1-R10 in FIG. 2 can be used to estimate the radio channel path loss PL between the portable radios and the base station sites 201-210 by subtracting the signal strength levels SSI received by the base station receivers from the portable radio transmitter power PRPWR (a known number preprogrammed into the GCC). Subtraction can be used since power levels are preferably expressed in decibels; or alternative logrithmic weighting (i.e., path loss PL=PRPWR−SSI). GCC 104 can combine this path loss estimate PL with programmed information pertaining to base station transmit powers BSPWR, antenna configurations etc., to determine the signal strength or power level RSS each transmitter T1-T10 is able to deliver to each portable radio receiver.

It should be recognized that the assumption of inbound/outbound path loss reciprocity is only approximately valid. In general, path losses are comprised of three elements: the median distance related component; the lognormally distributed small sector variations (including building losses); and the Rayleigh distributed losses which result from RF multipath fading. Realistically, it must be assumed that the inbound and outbound multi-path contributions are not equal, for these can can change fairly rapidly with RF frequency, and the inbound and outbound radio channel frequencies are not the same (in the preferred embodiment they differ by 45 mHz). The lognormal and median or Okumura type path loss contributions should be reciprocal, so long as the portable radio location is not significantly altered between time of collection of the inbound signal strength data and the time the outbound response is sent. Hence the use of inbound path loss measurements as a means for projecting corresponding outbound path losses is not precise. Rather it should be thought of as an estimating tool with statistical uncertainty. Furthermore, the channel protocol makes provisions for repeat transmissions which will help to mitigate any the effects of any sub-optimal choices resulting from this statistical uncertainty.

The path loss estimates can next be used to determine which of the transmitters T1-T10 are capable of delivering to the target portable signal power of sufficient level to exceed that target radio's receive sensitivity. Where several alternative choices are possible, these can be prioritized in accordance with parameters preprogrammed below. When the selected transmitter (eg. T10) is capable of delivering a signal power level which is significantly in excess of the target portable radio's (240) receive sensitivity it may be possible to operate additional base station transmitters (say T2) simultaneously to deliver unrelated message traffic to other portable radios (such as 250). The path loss estimates can be used to assess the interference impact of transmitter T2's transmission on the communication in progress between base site 210 and the target portable radio 240. Before GCC 104 will allow base site 202 to transmit to portable radio 250, it must first determine that transmitter T2 will not excessively interfere with the transmission in progress between T10 (at base site 210) and target portable radio 240. Since GCC 104 has recent estimates PLI for the radio channel path loss between base site 210 and portable radio 240, and additionally has path loss estimates PL2 for the base site 202 to portable radio 240 path, GCC 104 is able to compute the signal to interference level $S/I_{EST}$ which portable radio 240 would see if transmitter T2 is activated. Additionally the interference impact of site 210 on portable radio 250's reception of its desired message from base site 202 must be assessed through calculation of its S/I level. If both S/I levels exceed a predetermined level programmed into the GCC 104, transmitter T2 will be allowed to become active while transmitter T10 is still transmitting. If one or both the S/I levels does not exceed this predetermined level, then transmitter T2's transmission must wait until the transmission from transmitter T10 is completed.

The ability of the GCC 104 to estimate S/I levels at multiple target portable radio locations in the presence of multiple simultaneous base station transmissions allows the GCC to schedule base station tranmitter activity for maximum effectiveness, which results in much increased system throughout over what would be achieveable if only one base station were allowed to be active at a time.

The preceding paragraphs describe a system implementation in which all possible base station activity states are permissable, and the interference relationships are specifically determined at the time of each individual remote station to primary station tranmission. For system implementations in which the number of base station transmitters is large, the general communications controller's processing load can be significantly reduced by constraining the allowed base station transmitter activity states to a specified set of zones. In this context, each base station transmitter would have a number of zones associated with it. In the preferred embodiment, each base station transmitter has three zones, a first called a secondary reuse state, a second called a maximum coverage state and a third called a maximum reuse state. As an example, for a data communications system containing ten transmitters as shown in FIG. 2, zone Z1 could be defined as transmitter T1 active (to deliver a message to a selected portable radio station), and transmitters T2, T3, T4 inactive to prevent interference. An active transmitter is radiating an RF carrier signal and an inactive transmitter is not. As hereinabove defined, zone Z1 is a secondary reuse state. A second zone Z2 could be defined as transmitter T1 active, and all additional transmitters T2, T3, T4, T5, T6, T7, T8, T9, T10 inactive. Zone Z2 is a maximum coverage state since all but one transmitter is inactive. A third zone Z3 could be defined as transmitter T1 active, and none of the other transmitters need be inactive. Zone Z3 is a maximum reuse state. Each of the ten base station transmitters T1–T10 would typically have three zones associated with them, such that the total number of zones or base station activity states would be thirty. Such a set of zone definitions would reside in a table in GCC 104. A partial table is included hereinbelow as Table I.

TABLE I

Partial Zone Table For Geographic Area Shown In FIG. 2.

| Zone | Active Transmitters | Inactive Transmitters | Weight |
|---|---|---|---|
| Z1 | T1 | T2,T3,T4 | 4 |
| Z2 | T1 | T2,T3,T4,T5,T6,T7,T8,T9,T10 | 1 |
| Z3 | T1 | None | 6 |
| Z4 | T2 | T1,T3,T5 | 5 |
| Z5 | T2 | T1,T3,T4,T5,T6,T7,T8,T9,T10 | 1 |
| Z6 | T2 | None | 6 |
| Z7 | T3 | T1,T2,T4,T5,T6,T8 | 2 |
| Z8 | T3 | T1,T2,T4,T5,T6,T7,T8,T9,T10 | 1 |
| Z9 | T3 | None | 3 |
| Z10 | T4 | T1,T3,T6,T7 | 4 |
| Z11 | T4 | T1,T2,T3,T5,T6,T7,T8,T9,T10 | 1 |
| Z12 | T4 | None | 6 |
| Z13 | T5 | T2,T3,T8 | 5 |
| Z14 | T5 | T1,T2,T3,T4,T6,T7,T8,T9,T10 | 6 |
| Z15 | T5 | None | |
| . | . | . | . |
| . | . | . | . |
| . | . | . | . |
| Z28 | T10 | T8,T9 | 5 |
| Z29 | T10 | T3,T5,T6,T7,T8,T9 | 3 |
| Z30 | T10 | None | 7 |

This table in GCC 104 specifies for each zone entry which transmitter (or group of transmitters in a simulcast implementation) would be activated to transmit the desired message to the target portable radio, and which corresponding set of transmitters must be inactive for the duration of this message to reduce co-channel interference to a tolerable level. As discussed previiously, this decision would be based upon an analysis of RF signal levels received during a recent transmission from the target portable radio.

As an example, refer to FIG. 2 and consider a possible zone structure in which transmitter T10 is the active site from which the desired message is to be transmitted to the target portable radio 240. The area 280 in which transmitter T10 is centered represents the projected area over which transmitter T10 can provide RF coverage with a prescribed level of reliability (say, 90% reliability), given that no co-channel interference is allowed to occur. This zone can be defined as the maximum coverage state for that transmitter T10 and will be defined by the activity state: T10 is active; all other transmitters are inactive. Actually, this requirement can be made less restrictive by recognizing that certain sites are so far removed from transmitter T10, that they will cause little if any interference whether they are on or off. Assume sites 201, 202 and 204 fall into this category. With this relaxation, the maximum coverage zone can now be defined by the activity state, T10 is active, and cochannel activity is allowed on T1, T2 or T4. All other sites must be inactive. This maximum coverage state is zone Z29 in Table I.

A second zone which can be defined for transmitter T10 is the maximum reuse state. This zone is defined such that co-channel activity can be allowed on all other transmitters (neighboring and otherwise) while the desired message is being transmitted from site 210 to the target portable radio 240. This essentially says that the portable radio is so close to site 210 that its signals will capture any possible interference. Again, this determination can be reliably predicted by an analysis of the RF signal levels received at the various base station sites 201–210 during a recent transmission from the target portable radio. This maximum reuse state is zone Z30 in Table I.

Additional reuse zones can be defined as well. Assume a secondary reuse state is defined by inhibiting transmitter activity at adjacent sites only. For this zone the transmitters T8 and T9 must be inactive. All other transmitters may be used for cochannel activity. This secondary reuse state is zone Z28 in Table I. This zone choice would provide adequate coverage to most portable radios inside the RF coverage area 280. The primary exceptions would be any portable radios operating on high hills or in the upper stories of large buildings which might be susceptable to interference from far off base station sites. Use of this secondary reuse state Z28 would allow for significantly more co-channel reuse than would the maximum coverage state Z29 described previously.

What is disclosed in the foregoing paragraphs is a method of simplifying the implementation of the generalized transmitter selection/inhibit scheme described above. Here, the number of allowed transmitter activity states has been reduced from "all posible permutations" to a defined "set of zones" (typically three zones per transmitter site). In this context, a zone should be thought of as a transmitter activity state, not a geographic area. RF propagation characteristics are best defined in terms of statistical parameters and time variations. A portable radio could remain geographically fixed within a several square foot area, and yet "move" from zone to zone as propagation characteristics change over time or in response to small repositioning of the portable radio. This entire selection process is predicated on deciding which of a defined and allowed set of transmitter activity states (or zones) is capable of providing an RF propagation environment for reliably delivering the desired outbound message. This decision is based upon a evaluation of signal strength levels measured at all responding base station sites during recent transmissions from that target portable radio. In the event that more than one zone selection alternative is available, the communications controller will select the smallest (in a geographic sense) of the alternatives, using a zone prioritization algorithm programmed into the system controller that maximizes reuse.

The first step in the transmitter selection process is to assess which base station transmitters can be used to deliver a message to the target portable radio. Any base station transmitter which is capable of delivering an RF signal whose deliverable signal strength or power level at the portable radio's location will exceed the portable radio's receiver sensitivity threshold is a reasonable candidate for selection. The zones which satisfy this requirement are the maximum coverage zones for the associated base station sites. When evaluating the reuse zones which allow for simultaneous transmitter activity at multiple base station sites, the signal to interference level at the target portable radio's location is computed for each reuse zone, preferably using the worst case assumption that all transmitters are active unless inhibited for that zone (see Table I). In this case each zone for which the computed signal/interference level exceeds a predetermined capture threshold for the portable radio receivers (preprogrammed constant stored in GCC 104) can be selected for delivering the message. Thus, the interference due to other simultaneously active transmitters is taken into account when allowing reuse. Alternatively, only currently active transmitters can be taken into account when evaluating reuse zones.

In applications where co-channel reuse is of major concern, site selection alternatives can be further prioritized in terms of geographic coverage area. Hence, where several alternatives are available, these alternatives will be selected such that the base station transmitter site having the smallest geographic coverage area is selected first. In this case, the transmitter having the largest deliverable signal strength is not selected, but rather the transmitter which provides adequate deliverable signal strength and also allows maximum cochannel reuse is selected. This prioritization can be based upon look-up table entries contained in the GCC's data base. For example, transmitter T3 having coverage area 270 may be weighted one, while transmitter T10 having coverage area 280 may be weighted seven. These weighted or adjusted signal to interference levels are then rank ordered, and the zones or transmitter activity states associated with the top two adjusted S/I levels are selected as the primary and secondary zones to be used when next attempting to deliver a message to the target portable radio.

As an outcome of the analysis, the signal to interference level for each base station activity state or zone will be estimated using the path loss estimates determined during recent transmissions from the target portable radio. Each zone for which the signal/interference level is sufficiently large to assume high liklihood that the portable radio receiver would receive the scheduled outbound message is identified. These candidate zones are then prioritized so as to give precedence to transmitter activity states or zones which allow higher degrees of co-channel reuse. Hence base station sites which provide greater geographic coverage (mountain top sites, sites with very high towers or sites on tall buildings) are given minimal weighting. Sites operating from low buildings or towers, which provide more localized coverage, are given much higher weighting. That is, site 203 may be weighted one, while site 210 may be weighted seven. Additionally, zone configurations which require inhibiting few or no transmitters (maximum reuse or secondary reuse) are given higher weighting than are zone configurations which require the inhibiting of many transmitter sites (such as coverage zones). For example, maximum reuse zone Z12 may be weighted six and secondary reuse zone Z10 may be weighted four, while coverage zone Z11 may be weight one. A prioritized weighting scheme is illustrated in Table 1.

After this analysis and prioritization, the two zones or transmitter states having the largest adjusted signal to interference level for the last transmission received from each portable radio are stored in the memory of GCC 104. When GCC 104 receives a message from host 102 to be delivered to one of the portable radios 130, 132 or 134, GCC 104 will transmit this message in the zone which had the largest adjusted S/I level for the last transmission from that portable radio. If the portable radio does not acknowledge the transmission of the message signal, GCC 104 may attempt one or more retransmissions of the message signal by means of that selected transmitter state or zone. If the retransmissions likewise are not acknowledged by the portable radio, GCC 104 may then transmit the message signal via the transmitter covering the zone which had the second largest adjusted signal to interference level for the last transmission from that portable radio. Again, if the portable radio does not acknowledge the transmission, GCC 104 may resend the message signal one or more times by means of that selected transmitter. If GCC 104 does not reach the selected portable radio by means of these two transmitters, it may next select the zone used for the last successful communication with that portable radio. If GCC 104 does not reach the selected portable radio after one or more attempts in this zone, it may either select another transmitter covering that portable radio's "home" zone, or initiate a polling sequence in which the selected portable radio is polled in every zone or a subset of all zones in the data communications system starting with the portable radio's "home" zone or simultaneously in all or groups of zones.

Figure 3:
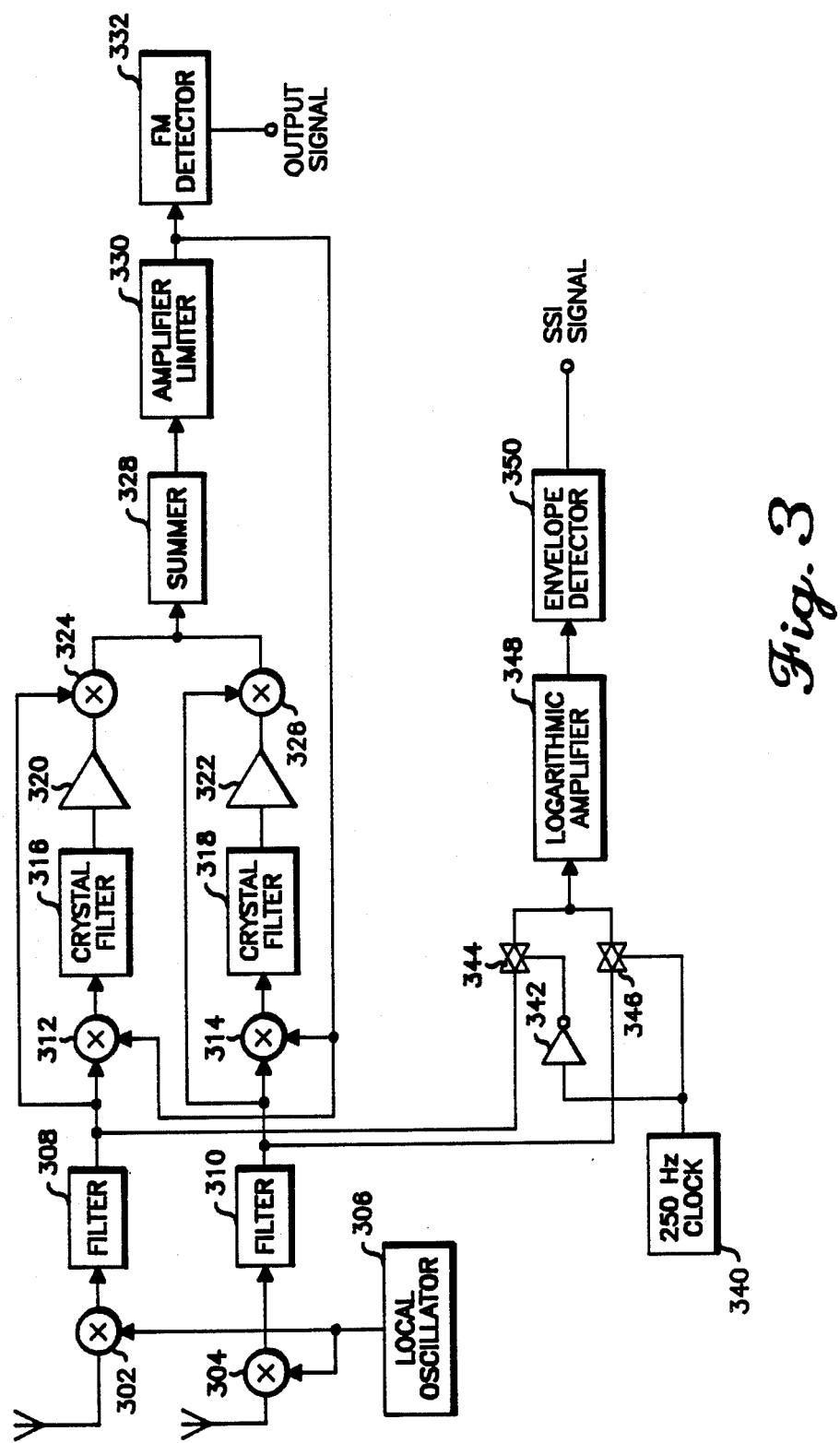
FIG. 3 is a block diagram of the circuitry in the base station receivers in FIG. 1.

Referring to FIG. 3, there is illustrated a detailed circuit diagram of the base station receivers 116, 122, and 126 associated with CCM's 106, 108 and 110 in FIG. 1. Each receiver preferably includes two antennas spaced at a predetermined distance from one another and a maximal ratio predetection diversity combiner 312, 314, 316, 318, 320, 322, 324, 326 and 328 for combining the signals received by each of the antennas. The space diversity provided by the two antennas is utilized to prevent degradation in communications which results when an antenna is located in an RF signal null. Although optional, the use of diversity minimizes reception of errors in the incoming data and also enhances accuracy of the path loss estimates since it reduces variations on signal levels. Rapid and deep RF signal nulls, called Rayleigh fading, are experienced more frequently in communications systems operating at RF signal frequencies in the new 800 to 900 mHz frequency range. The maximal ratio predetection diversity combiner cophases the RF signals from each antenna and linearly adds the cophased signals to provide a composite signal having components that are proportional to the square of the RF signals from each antenna. Therefore, strong signals are emphasized much more than weak signals. In other words, communications are not adversely affected if a very weak signal is received by one antenna and a reasonably good signal is received by the other antenna.

In the diversity receiver in FIG. 3, the frequency of local oscillator 306 determines which radio channel to which the diversity receiver is tuned. The RF signal received by each antenna is combined by mixers 302 and 304 with the signal from local oscillator 306 to provide corresponding IF signals. The IF signal from mixers 302 and 304 is then applied to IF bandpass filters 308 and 310, respectively, which may be a monolithic bandpass filter of conventional design similar to that described in U.S. Pat. No. 3,716,808 (incorporated herein by reference). The filtered IF signals from filters 308 and 310 are split and fed forward via two paths to mixers 312, 324 and 314, 326, respectively. First portions of the IF signals are applied to mixers 324 and 326, and second portions of the IF signals are applied to mixers 312 and 314 together with the composite IF signal which is fed back from amplifier 330. By feeding back the composite IF signal, the IF strip of the diversity receiver forms a closed feedback loop that is regenerative on noise. Thus, the randomly varying phase of the IF signals from filters 308 and 310 relative to the composite IF signal is added into the closed loop via mixers 312 and 314 and then substracted out at mixers 324 and 326, respectively. By this process, the random phase variations are removed from the IF signals in relation to the composite IF signal. The result is that each of the IF signals is cophased to the composite IF signal.

The product signals from mixers 312 and 314 at the difference frequency are applied to filters 316 and 318, respectively, which each provide a variable phase shift. Filters 316 and 318 may be two-pole crystal filters. The signals from filters 316 and 318 are linearly amplified by amplifiers 320 and 322, respectively and applied to the second input of mixers 324 and 326, respectively. Mixers 324 and 326 multiply the signals from amplifiers 320 and 322, respectively, with the IF signals from filters 308 and 310, respectively, to provide product signals that are cophased with the composite IF signal. The product signals from mixers 324 and 326 are both cophased and proportional to the square of the level of the IF signals from filters 308 and 310, respectively. The product signals from the mixers 324 and 326 are linearly added by summer 328 to form one composite IF signal. The composite IF signal may be coupled via amplifier 330 to a conventional FM detector 332 which has an output signal providing demodulated message signals. The output signal of FM detector 332 is coupled to its corresponding CCM 106, 108 or 110 in FIG. 1. Further details of the circuitry in the diversity receiver in FIG. 3 are illustrated and described in the instant assignee's co-pending U.S. patent applications, Ser. No. 22,757 (now U.S. Pat. No. 4,369,520), filed on Mar. 22, 1979, entitled "Instantaneously Acquiring Sector Antenna System", and invented by Frank J. Cerny, Jr. and James J. Mikulski, and in Ser. No. 268,613 (now U.S. Pat. No. 4,519,096) filed on June 1, 1981, entitled "Large Dynamic Range Multiplier for a Maximal Ratio Diversity Combiner", and invented by Frank J. Cerny, Jr., both incorporated herein by reference.

FIG. 3 also illustrates the circuitry 340, 342, 344, 346, 348 and 350 comprising the signal strength detector that is located in the receivers. Logarithmic amplifier 348 is switchably coupled to the signals from filters 308 and 310 by clock 240 and gates 342, 344 and 346 and provides a composite signal which is coupled to envelope detector 350. Envelope detector 350 provides an SSI signal that is proportional to the maxima of the composite signal from amplifier 348 and also time averaged to smooth variations. Amplifier 348 should preferably be a log-amplifier to provide for both extended dynamic range and logrithmic weighting which simplifies the GCC computations. A separate amplifier 348 and envelope detector 350 can be provided for each of the signals from filters 308 and 310 if it is desired to measure each separately. The SSI signal from envelope detector 350 is coupled to its corresponding CCM 106, 108 or 110 in FIG. 1, where it is digitized. Suitable signal strength detecting circuitry is described in detail in the instant assignee's copending patent application Ser. No. 505,625, (now U.S. Pat. No. 4,531,235) filed June 20, 1983, entitled "Diversity Signal Strength Indicator and Site Selection Apparatus for Using Same", invented by Karl R. Brusen, and incorporated herein by reference. Many other types of commercially available signal strength detecting circuitry can be utilized in place of clock 340, gates 342, 344 and 346, amplifier 348, and envelope detector 350.

Figure 4:
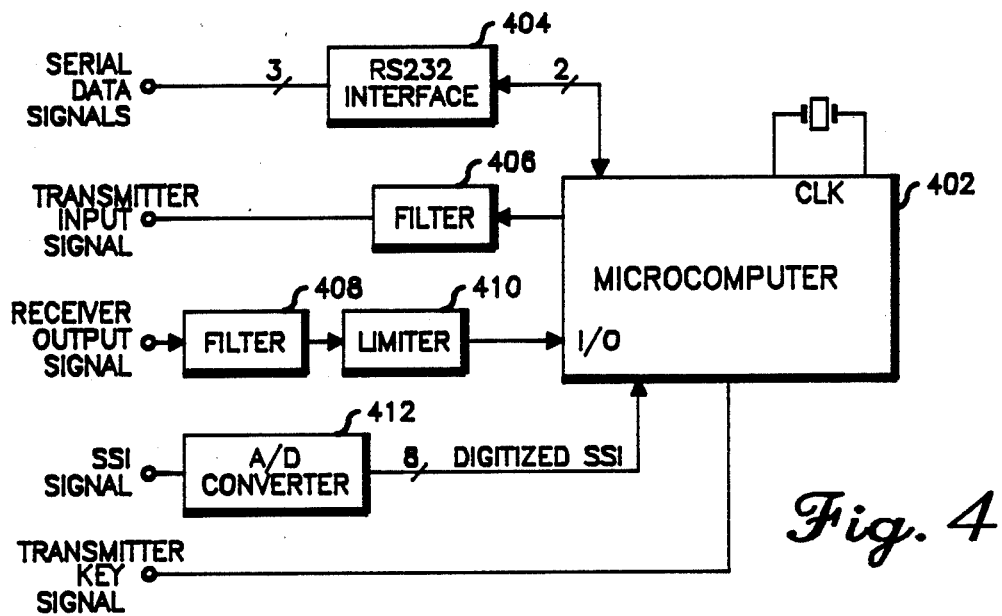
FIG. 4 is a block diagram of the circuitry in the channel communications modules in FIG. 1.

Referring to FIG. 4, there is illustrated a block diagram of the circuitry in CCM's 106, 108 and 110 in FIG. 1. Each CCM includes a microcomputer 402 having a memory with stored program therein for communicating with GCC 104 and portable radios 130, 132 and 134 in FIG. 1. Microcomputer 402 can be any suitable commercially available microcomputer such as, for example, the Motorola type MC6800, MC6803 or MC68000 microprocessor, or those microprocessors described in U.S. Pat. Nos. 4,030,079 and 4,266,270, and the patents and patent applications referred to therein, all incorporated herein by reference.

Microcomputer 402 is coupled to RS232 interface 404 which may be coupled by a modem to a dedicated telephone line from GCC 104 in FIG. 1. Message signals received by microcomputer 402 from the GCC may be coupled in to filter 406 and thereafter applied to its corresponding base station transmitter. The transmitter is turned on (active) and off (inactive) by means of the transmitter key signal provided by microcomputer 402. The message signals may be coded according to frequency-shift keying, phase-shift keying or any other suitable existing encoding scheme. Suitable message signal coding schemes are described in the aforementioned U.S. Pat. Nos. 3,906,445, 4,156,867 and 4,354,252 and patent application Ser. Nos. 402,682, 512,800 and 512,801. Message signals received from portable radios by the base station receiver are coupled to filter 408 and thereafter to limiter 410 which converts the analog signals into a non-return-to-zero binary signal. The output of limiter 410 is applied to an input port of microcomputer 402.

Microcomputer 402 also takes signal strength readings while it is receiving message signals. The SSI signal from its corresponding base station receiver is coupled to A/D converter 412, which may continuously convert the analog SSI signal to a digitized SSI signal. The digitized SSI signal from A/D converter 412 is applied to an input port of microcomputer 402. Several A/D conversions are performed while a message signal is being received. The digitized SSI signals for the several conversions are averaged by microcomputer 402. The logrithmically weighted SSI signal is appended to the received message signal which is sent by microcomputer 404 via RS232 interface 404 to GCC 104 in FIG. 1.

Figure 5:
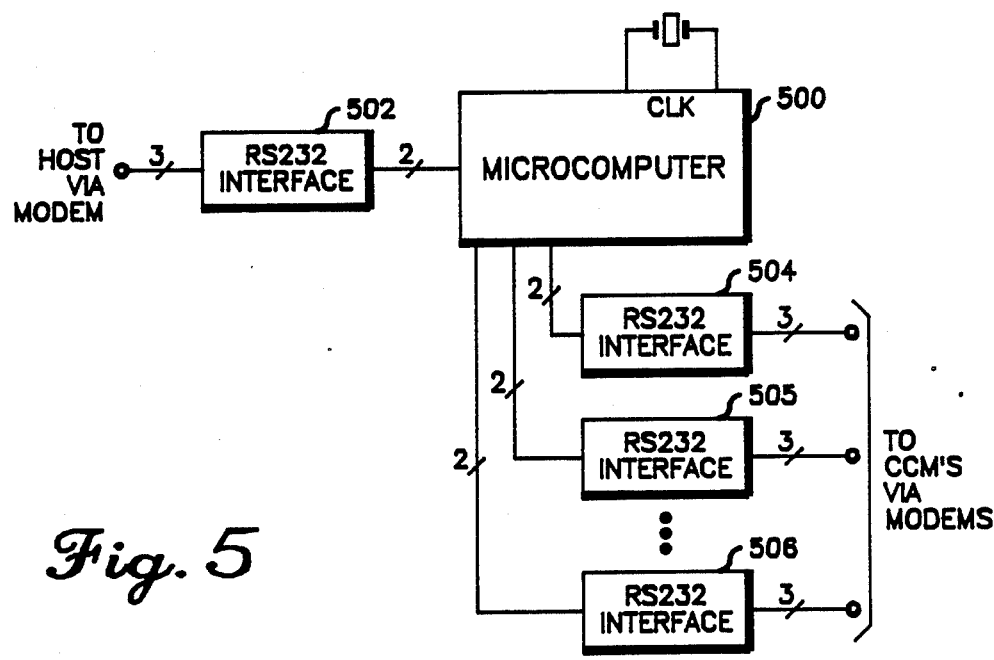
FIG. 5 is a block diagram of the circuitry in the general communications controller in FIG. 1.

Referring to FIG. 5, there is illustrated a block diagram of the circuitry in the general communications controller 104 in FIG. 1. The GCC includes a microcomputer 500 having a memory with a stored program for communicating with CCM's 106, 108 and 110 in FIG. 1. Microcomputer 500 is coupled to RS232 interfaces 504, 505 and 506 which may be coupled by modems to dedicated telephone lines from each CCM. Microcomputer 500 is also coupled to RS232 interface 502 which may be coupled to a dedicated telephone line from host computer 102 in FIG. 1. Information in message signals received from portable radios by way of CCM's 106, 108 and 110 is forwarded by microcomputer 500 to host computer 102. Conversely, information to be sent to portable radios from host computer 102 is transmitted to microcomputer 500 and incorporated into message signals transmitted to designated portable radios. Microcomputer 500 receives signal strength information from each of the CCM's whenever a portable radio transmits a message signal and processes the signal strength information to determine the zone in which that portable radio is presently located.

Microcomputer 500 stores for each portable radio the zone having the largest adjusted signal/interference level for the last transmission, the zone having the second largest adjusted signal/interference level for the last transmission, the "home" zone assigned to that portable radio, and the last zone used for communications with that portable radio. For subsequent transmissions of message signals to a portable radio, the GCC accesses the zone location information for that portable radio and selects one or more of the base station transmitters for transmitting a message signal corresponding to that zone. Microcomputer 500 also keeps track of which transmitters are active and which transmitters must be inactive to prevent interference to communications in a particular zone. Thus, when transmitting a message signal in a selected zone, microcomputer 500 inhibits the use of are active and which transmitters must be inactive to prevent interference to communications in a particular zone. Thus, when transmitting a message signal in a selected zone, microcomputer 500 inhibits the use of other transmitters which would interfere with communications in that zone. If transmission of a message signal to a portable radio would interefere with a transmission already under way, microcomputer 500 queues that message signal for transmission after the message in process has been transmitted. Microcomputer 500 can be any suitable commercially available microcomputer, such as, for example, a Motorola type MC6800, MC6803 or MC68000 microprocessor, or those microprocessors described in U.S. Pat. Nos. 4,030,079 and 4,266,270 and the patents and patent applications referred to therein, all incorporated herein by reference.

Figure 8:
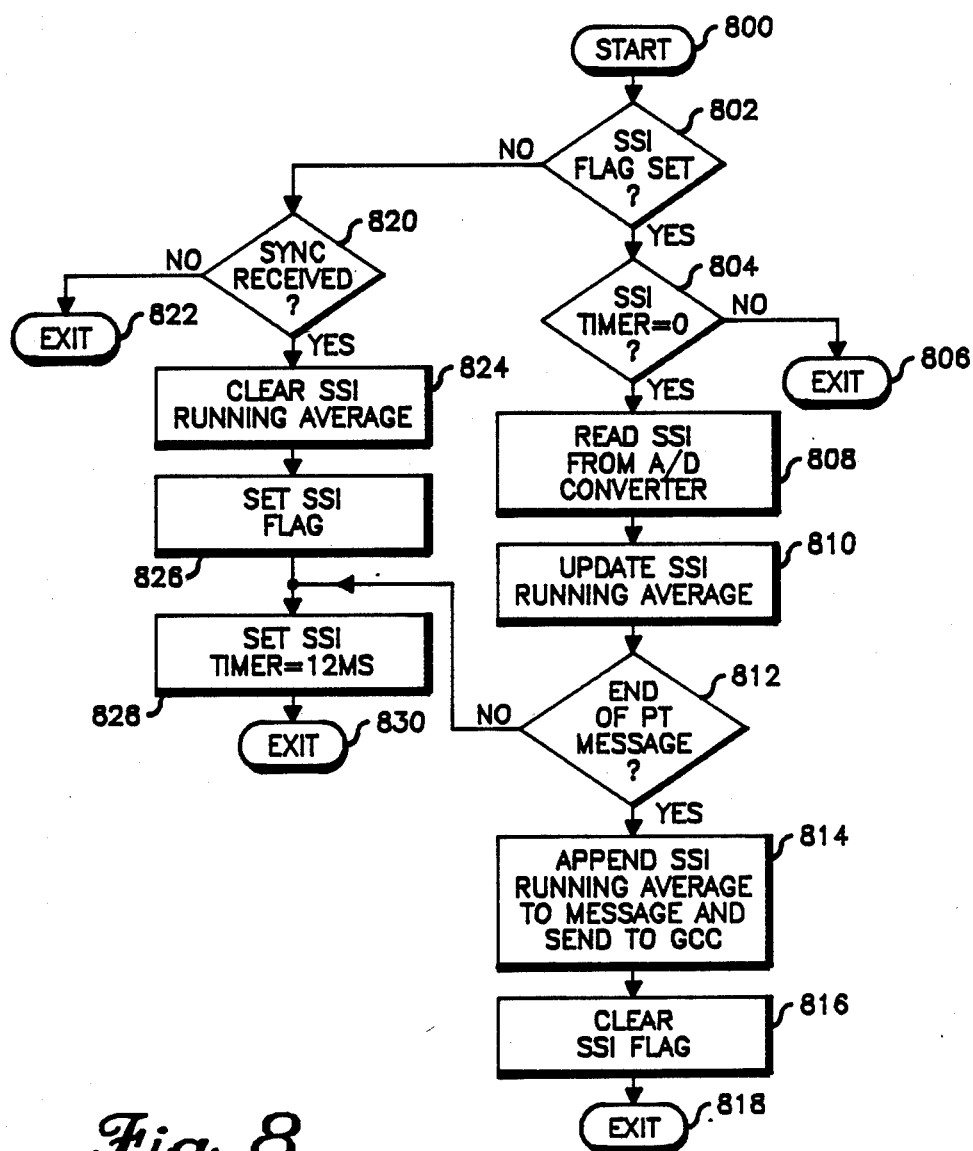
FIG. 8 is a flow chart used by the channel communications module for measuring the signal strength of signals transmitted by the portable radios in FIG. 1.

Referring next to FIG. 8, there is illustrated a flow chart including the process steps used by CCM's 106, 108 and 110 in FIG. 1 for measuring the signal strength of RF signals transmitted by portable radios. The flow chart in FIG. 8 provides a detailed description of the process steps required for execution by microcomputer 402 in FIG. 4. The coding of the process steps of the flow chart in FIG. 8 into the instructions of a suitable commercially available microcomputer is a mere mechanical step for a routineer skilled in the computer programming art.

Entering the flow chart in FIG. 8 at start block 800, a check is made to see if the SSI flag is set at decision block 802. If the SSI flag is not set, NO branch is taken to decision block 820 where it is determined whether or not a SYNC (synchronization) word has been detected. The SYNC word is part of each data packet in a message signal and is followed by alpha-numeric information and/or hexadecimal data. The particular bit pattern of the SYNC word is detected by microcomputer 402 in FIG. 5. Signal strength measurements need not be taken until a SYNC word is detected. Once a SYNC word has been detected, several signal strength measurements can be taken at different times during receipt of the message signal and then averaged to obtain a more stable estimate of the signal strength for the portable radio transmitting that message signal.

If a SYNC word has not been received, NO branch is taken from decision block 820 to block 822 to exit from the flow chart in FIG. 9. Otherwise, YES branch is taken from decision block 820 to block 824 where the SSI running average is cleared. Next, at block 826, the SSI flag is set, and then at block 828 the SSI timer is set to twelve milliseconds. Assuming that a data packet has a length of approximately twenty-four milliseconds, the SSI timer is set at twelve milliseconds so that two signal strength measurements will be taken for each data packet. Next, the flow chart is exited at block 830.

Returning back to block 802 in FIG. 8, the SSI flag is set whenever a message signal is being received from a portable radio. Assuming the SSI flag was previously set, YES branch is taken from decision block 802 to decision block 804 where it is determined if the SSI timer is equal to zero. Assuming that microcomputer 402 in FIG. 5 is interrupted once every millisecond, the SSI timer may be decremented and the flow chart in FIG. 8 may be executed every millisecond in response to each interrupt. As a result, the SSI timer will be zero twelve milliseconds after a SYNC word has been received. If the SSI timer is not equal to zero, NO branch is taken to exit from the flow chart at block 806. Otherwise, YES branch is taken to block 808 where the digitized SSI signal is read from A/D converter 412 in FIG. 4. Next, at block 810, the newly read digitized SSI signal is averaged with the SSI running average.

Proceeding to decision block 812 in FIG. 8, a check is made to determine if the end of the portable radio message signal has been reached. If the end of the message signal has not been reached, NO branch is taken to block 828 where the SSI timer is set to twelve milliseconds for taking another signal strength measurement. Otherwise, YES branch is taken from decision block 812 to block 814, where the SSI running average is appended to the message signal which is sent to GCC 104 in FIG. 1. Next, at block 816, the SSI flag is cleared in preparation for receipt of subsequent message signals, and the flow chart is exited at block 818.

The process steps of the flow chart in FIG. 8 are designed to take two signal strength measurements for each data packet in a message signal received from a portable radio. For example, if there are four data packets in a message signal, eight signal strength measurements are taken and averaged. All CCM's 106, 108 and 110 in FIG. 1 receiving the same message signal from a portable radio are likewise taking two signal strength measurements per data packet and appending the average signal strength to the message signal that is routed to the GCC. Therefore, within a short period of time, the GCC will be receiving several different average signal strength measurements from the CCM's that receive the same message signal from a portable radio.

Figure 6:
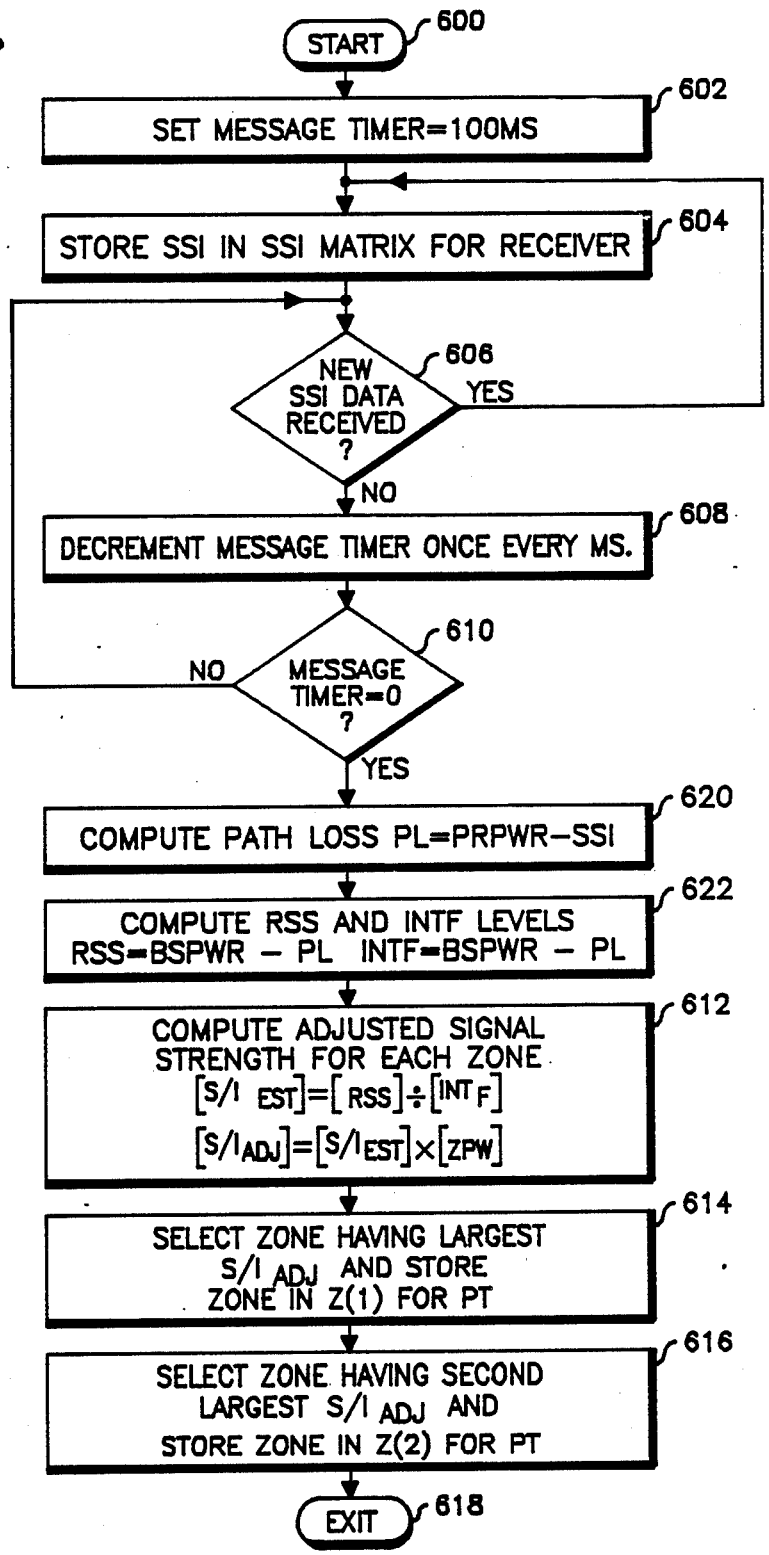
FIG. 6 is a flow chart used by the general communications controller for processing signal strength data received from the channel communications modules in FIG. 1.

Referring to FIG. 6, there is illustrated a flow chart used by GCC 104 for processing the average signal strength measurements received from each of the CCM's 106, 108 and 110 in FIG. 1. The flow chart in FIG. 6 is entered at start block 600 whenever a message signal together with an average signal strength measurement is received from a CCM. Next, at block 602 a message timer is set to one-hundred milliseconds to provide a time interval during which the same message signal is received by other CCM's and sent together with an average signal strength measurement to the GCC. All CCM's should receive, if at all, the same message signal at approximately the same time. The one-hundred millisecond message time interval is utilized to allow CCM for processing and transmission delays. Assuming that microcomputer 500 in FIG. 5 is interrupted once every millisecond, the message timer may be decremented in response to each interrupt.

Next, at block 604 in FIG. 6, the average signal strength measurement received with a message signal is entered into the SSI matrix in the position for the receiver that took the measurement. Proceeding to decision block 606, a check is made to see if another average signal strength measurement has been received from another CCM. If so, YES branch is taken back to block 604. Otherwise, NO branch is taken to block 608 where the message timer is decremented once every millisecond. Next, at decision block 610 a check is made to see if the message timer is equal to zero. If not, NO branch is taken back to decision block 606 to check to see if another average signal strength measurement has been received. Otherwise, YES branch is taken to blocks 620, 622 and 612 for processing the average signal strength measurements that have been received during the previous one-hundred millisecond time interval.

Proceeding to blocks 620, 622 and 612 in FIG. 6, an adjusted signal/interference level is computed for each zone using the newly received average signal strength measurements that have been entered into the SSI matrix. First, at block 620 the signal strength measurements in the SSI matrix are used to calculate the path loss PL for each base station receiver. The path loss PL is computed by subtracting the SSI levels from the portable radio transmitter power PRPWR(i.e., PL=PRPWR−SSI) which in the preferred emobidiment is four watts. Next, at block 622 the deliverable signal strength RSS matrix is computed using the path loss estimates PL for each base station receiver. GCC 104 can combine the path loss estimates PL with programmed information pertaining to base station transmit powers BSPWR, antenna configurations etc., to determine the signal strength or power level RSS each transmitter is able to deliver to each portable radio reciever. Then, at block 612, the signal to interference level $S/I_{EST}$ matrix is compute by dividing the RSS levels by the interfering INTF levels due to the other transmitters allowed to simultaneously transmit (alternatively, transmitters currently transmitting). The signal levels in the $S/I_{EST}$ matrix preferrably must be greater than the capture threshold of the portable radio in order to use the corresponding transmitter to deliver the message in that zone. Lastly, the $S/I_{ADJ}$ matrix is computed by multiplying the $S/I_{EST}$ matrix and the zone priority weight ZPW matrix. The foregoing computations are made according to the formulas:

$$[S/I_{EST}] = [RSS] \div [INTF]$$

$$[S/I_{ADJ}] = [S/I_{EST}] \times [ZPW]$$

The resulting $S/I_{ADJ}$ matrix has one adjusted signal to interference level for each zone in the data communications system, which represents the ratio of the deliverable signal strength RSS of the corresponding base station transmitter to the sum of the interfering signal strength INTF of other base station transmitters allowed to be simultaneously active, as weighted for priortization of zone reuse. If signal strength levels are logarithmic weighted, the above formula is computed by adding and/or subtracting the levels in the matrices. Since some of the zones may be far removed from the target portable radio, perhaps even in different cities, some of the adjusted signal to interference levels may be zero. For the zone configuration in FIG. 2, it is possible that transmissions from a portable radio will be received by all ten receivers R1 through R10, producing adjusted signal to interference levels for all zones Z1, Z2, Z3 . . . Z30.

According to another feature of the present invention, the $S/I_{EST}$ matrix can be stored and later used in combination with the $S/I_{EST}$ matrix for the next transmission from the same portable radio. For example, the signal path loss estimates the stored $S/I_{EST}$ matrix can be decreased on the basis of the time interval between the previous and newly received transmission from the portable radio. Next, the decreased path loss estimates and the new path loss estimates may be averaged for each base station receiver, and the average path losss estimates may be used to calculate the $S/I_{ADJ}$ matrix in block 612 in FIG. 6. The average path loss estimates may then be stored in the $S/I_{EST}$ matrix for use with the signal strength measurements taken for a subsequent transmission from the same portable radio.

Next, at block 614 in FIG. 6, the zone having the largest adjusted signal/interference level in the $S/I_{ADJ}$ matrix computed in block 612 is selected and stored in zone location Z(1) for the portable radio whose transmitted message signal was received by each of the base stations. The number of base stations receiving a message signal and making a signal strength measurement for a portable radio will vary depending both on the location of the portable radio and the terrain and location of receivers in the geographical area of the data communications system. In other words, depending on the location of a portable radio, as few as one and potentially all of the base station receivers may receive the same message signal from a portable radio.

Next, at block 616, the zone having the second largest adjusted signal/interference level in the $S/I_{ADJ}$ matrix is selected and stored in zone location Z(2) for the particular portable radio. Zone selections Z(1) and Z(2) represent a good compromise between the two objectives of: selection of a communications path with high reliability and low liklihood of interference; and maximizing the amount of co-channel reuse throughout the data communications system coverage area. Every time a portable radio transmits a message signal, new signal strength measurements are taken and the zones stored in zone locations Z(1) and Z(2) for that portable radio are updated. Therefore, according to the present invention, the zone selections for a portable radio are updated by GCC 104 every time the portable radio transmits a message signal. GCC 104 recomputes these selections using the signal strength measurements taken by all of the base station receivers that receive the portable radio's message signal. To insure that location information does not become stale, GCC in FIG. 1 can initiate short "where-are-you" message signals for those portable radios that have been inactive for a relatively long period of time.

Figure 7:
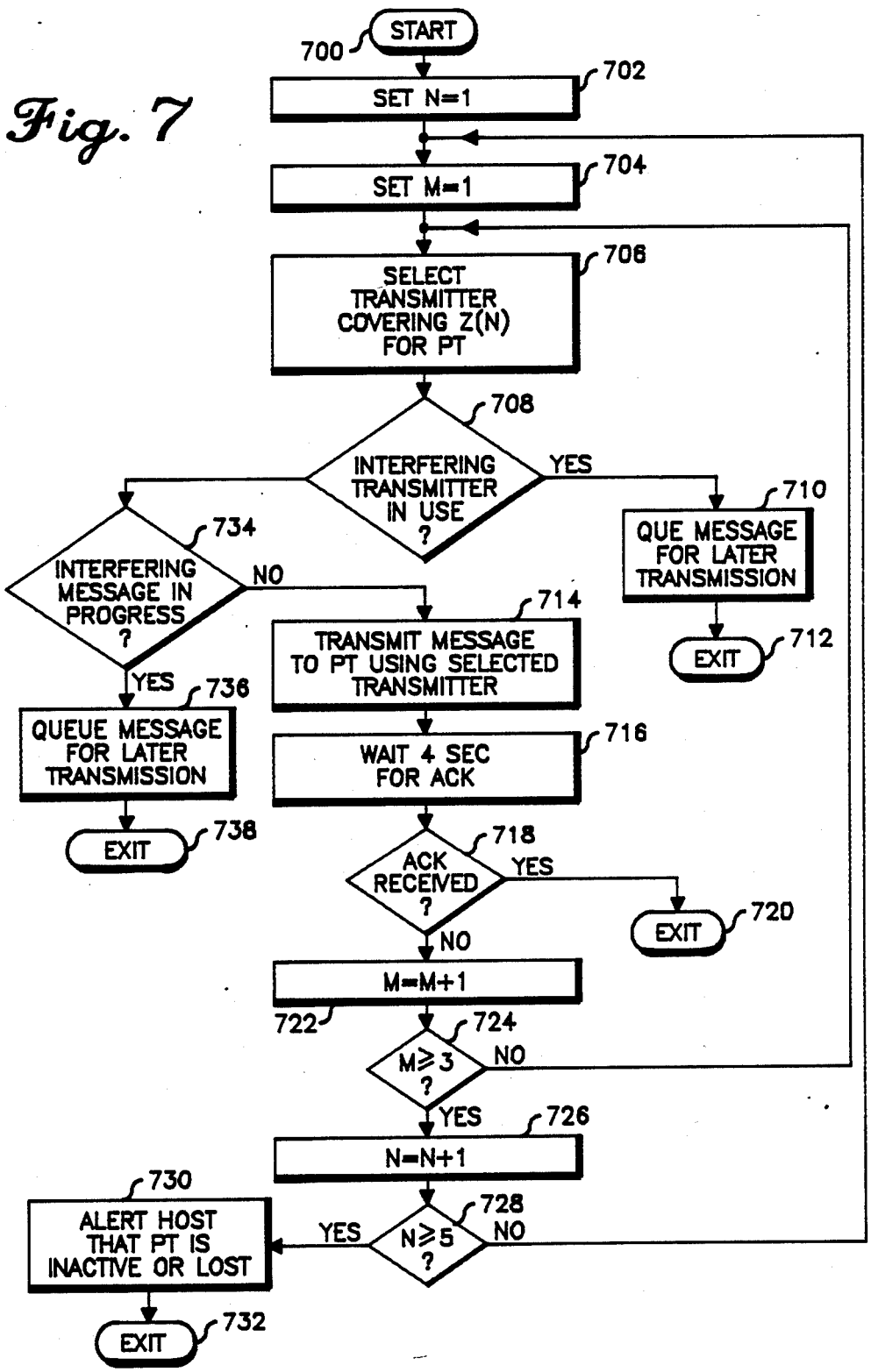
FIG. 7 is a flow chart used by the general communications controller for selecting a transmitter on which message signals, are transmitted to a selected portable radio in FIG. 1.

Whenever it is desired to transmit a message signal from GCC 104 in FIG. 1 to a selected portable radio, the flow chart in FIG. 7 is utilized by the GCC for selecting the base station transmitter covering the zone where the portable radio is most likely located. Entering the flow chart in FIG. 7 at start block 700, N is set equal to 1 at block 702 and M is set equal to one at block 704. N is an integer number used to determine which zone Z(1), Z(2), Z(3) or Z(4) is target, and M is an integer number used to determine the number of retransmissions made to a particular zone.

Next, at block 706 in FIG. 7, the GCC selects the transmitter covering zone location Z(N) for the target portable radio. Initially, the GCC selects zone Z(1). As previously explained, zone Z(1) is the zone having the largest adjusted signal/interference level for the last transmission from the target portable radio, zone Z(2) is the zone having the second largest adjusted signal/interference level for the last transmission from the target portable radio, zone Z(3) is the zone used for the last successful transmission to the target portable radio and zone Z(4) is the "home" zone for the target portable radio.

Proceeding next to decision block 708 in FIG. 7, a check is made to see if an interfering transmitter is in use (i.e., active). The interfering transmitters are determined by reference to the ZIF matrix, which identifies active transmitters that interfere with communications in zone Z(N). If one or more interfering transmitters are in use and these active transmitters would prevent capture of the selected portable radio receiver by the desired transmitter, YES branch is taken to block 710 where the message signal is queued for later transmission to the selected portable radio, and the flow chart is exited at block 712. If interfering transmitters are not in use or are in use but do not prevent FM capture of the selected portable radio receiver by the desired transmitter, NO branch is taken to block 734 where a check must be made to determine if traffic currently in progress in other zones blocks the use of this transmitter at this time. If YES branch is taken from block 734 to block 736, the message signal is queued for later transmission to the target portable radio and the flow chart is exited at block 738. If NO branch is taken from block 734 to block 714, a message signal is transmitted to the selected portable radio using a transmitter covering zone Z(N). At the same time, interfering transmitters listed in Table I for zone Z(N) must be prevented from transmitting while the message signal is being sent to the target portable radio.

Next, at block 716 in FIG. 7, the GCC waits for four seconds to determine if an acknowledgement message has been received from the target portable radio. If the target portable radio receives the transmitted message signal, it will transmit an acknowledgement signal indicating that the message signal has been properly received. Proceeding to decision block 718, a check is made to see if an acknowledgement signal has been received. If so, YES branch is taken to block 720 and the flow chart is exited. In other words, the message signal has been successfully communicated to the target portable radio. If an acknowledgement signal has not been received, NO branch is taken to block 722 where M is incremented by 1. The variable M is used to provide for one or more re-transmissions of the message signal to the same zone. In the preferred embodiment, one re-transmission in this zone is allowed. Therefore, at decision block 724 a check is made to see if M is greater than or equal to three. If M is less than three, NO branch is taken back to block 706 for re-transmitting the message signal to zone Z(N). If M is greater than or equal to three, YES branch is taken to block 726 for preparing to transmit the message signal in the next zone selected.

At block 726 in FIG. 7, N is incremented by one for selecting the next zone. Proceeding to decision block 728, a check is made to see if N is greater than or equal to five. If N is less than five, NO branch is taken to block 704 where M is set equal to one and the process steps are repeated for the next zone Z(N). The process steps are repeated beginning at block 704 for each of the zones Z(2), Z(3), and Z(4) so that a message signal is transmitted, and re-transmitted once, in all four stored zones in an attempt to communicate a message signal to the target portable radio. If N is greater than or equal to five, YES branch is taken from decision block 728 to block 730 where the GCC alerts host computer 102 in FIG. 1 that the target portable radio is either inactive or lost. At this point in time, the host computer may decide to poll the target portable radio in a selected set of zones of the data communications system. Such a poll would be conducted on a low priority basis using a minimum length message signal. Next, the flow chart in FIG. 7 is exited at block 732.

The flow charts in FIGS. 6 and 7 provide a detailed description of the process steps used by GCC microcomputer 500 in FIG. 5 for communicating message signals to portable radios. The coding of the process steps of the flow charts in FIG. 6 and 7 into the instructions of a suitable commercially available microcomputer is a mere mechanical step for a routineer skilled in the computer programming art. By way of analogy to an electrical circuit diagram, the flow charts in FIGS. 6, 7 and 8 are equivalent to a detailed schematic for an electrical circuit where provision of the exact part values for the electrical components in the electrical schematic corresponds to provision of microcomputer instructions for blocks in the flow charts.

Referring to FIG. 9, there is illustrated a block diagram of the circuitry in portable radios 130, 132 and 134 in FIG. 1. Each portable radio includes a radio transceiver 940, microcomputers 920 and 960, an alphanumeric display 910, and a keyboard 912. Alphanumeric display 910 may be any commercially available display, such as an LCD display or gas discharge display, that provides for the display of one or more lines of alphanumeric information. Display 910 is controlled by I/O device 921 of microcomputer 920. Keyboard 912 may be any commercially available keyboard having both numeric and alphanumeric keys. Keyboard 912 is coupled to I/O device 912 of microcomputer 920, which senses activation of its various keys.

Radio transceiver 940 in FIG. 9 may be any suitable commercially available transceiver, such as that described in the aforementioned Motorola instruction manual no 68P81039E25 and in Motorola instruction manual no. 68P81014C65. Radio transceiver 940 includes two antennas spaced at a predetermined distance from one another for providing receiver diversity. The two antennas may also be located within the radio housing as shown and described in the instant assignee's copending patent applications, Ser. No. 511,430, entitled "Homotropic Antenna System", invented by Thomas F. Kneisel et al., filed on July 6, 1983, and Ser. No. 511,431, entitled "Signal Quality Steered Diversity" invented by Eugene J. Bruckert et al., and filed on July 6, 1983. Receiver 941 may be automatically coupled to one antenna or by antenna switch 942 to the other antenna as is appropriate for best reception. Antenna switch 942 may be any suitable commercially available antenna switch, such as that described in aforementioned U.S. patent application Ser. No. 511,430. Receiver 941 may include suitable commercially available circuits for selecting between the two antennas, such as, for example, the antenna selection circuitry in the aforementioned patent application Ser. Nos. 511,430 and 511,431 and in Motorola instruction manual no. 68P81039E25. Receiver 941 demodulates message signals transmitted from the base station transmitters. The demodulated message signals are filtered by filter 916 and limited by limiter 914 and thereafter applied to I/O device 961 of microcomputer 960. Message signals from I/O device 961 of microcomputer 960 are applied to filter 918 and thereafter to transmitter 943 for transmission to base station receivers. Transmitter 943 is turned on in response to the TX key signal from I/O device 961 of microcomputer 960. The output of transmitter 943 is coupled to one of the radio transceiver antennas by way of antenna switch 942.

Microcomputers 920 and 960 in FIG. 9 each include I/O devices 921 and 961, microprocessor (MPU) 922 and 962, random-access memory (RAM) 926 and 966, and read-only memory (ROM) 923 and 963, respectively. Microcomputer 920 also includes a removable I.D. ROM 924, which contains the sixteen bit address assigned to the portable radio. MPU's 922 and 962 may be any suitable commercially available microprocessor, such as, for example, the Motorola Type MC6800, MC6803, MC6805 or MC68000 microprocessors, or those microprocessors described in U.S. Pat. Nos. 4,030,079 and 4,266,270 and the patent applications referred to therein. Similarly, I/O device 921 and 961, RAM 926 and 966, ROM 923 and 969 and I.D. ROM 924 may be any commercially available devices that are suitable for operation with the type of microprocessor selected for MPU's 622 and 962. ROM's 923 and 963 store the control programs that are executed by MPU's 922 and 962, respectively for communicating message signals and acknowledgement signals between the portable radio and GCC 104 in FIG. 1. RAM 926 includes both a scratch pad area used by MPU 922 during execution of the control program stored in ROM 923 and a number of register locations allocated for storing the address or identification code of the portable radio read in by MPU 922 from I.D. ROM 924, information displayed by display 910, information entered from keyboard 912, and other status and control information. The contents of specific registers in RAM 926 may be loaded or read-out by way of message signals received from GCC 104 in FIG. 1.

Microcomputer 960 in FIG. 9 receives messages by way of receiver 941 from the GCC. Microcomputer 960 demodulates, de-interleaves and decodes the information and data in each message and loads the data into shared memory 950, which includes semaphore 951 and RAM 952. Access of RAM 952 is controlled by semaphore 951, which is shown and described in further detail in the instant assignee's co-pending patent application, Ser. No. 480,777, entitled "Semaphore For Memory Shared by Two Asynchronous Microcomputers", invented by John P. Byrns, filed on Apr. 22, 1983, and incorporated herein by reference. Microcomputer 920 then accesses the new information and data from shared memory 950 and processes it. Information and data to be transmitted is formatted into information and data words as described in the aforementioned patent application Ser. Nos. 512,800 and 512,801, and loaded into shared memory by microcomputer 920. Microcomputer 960 reads out the information and data words from shared memory 950 and assembles the information and data words into messages 203, 204 as illustrated in FIG. 2 and automatically transmits the messages to the GCC.

The portable radio illustrated in FIG. 9 may be either a mobile radio that is installed in a vehicle or a portable radio that is small enough to be hand-carried from place to place (See the aforementioned Motorola instruction manual number 68P81035C35 and patent application Ser. No. 511,430). Although the portable radio in FIG. 9 is primarily adapted to transmit and receive message signals including alphanumeric information, the portable radio may also provide voice communications by means of a speaker (not shown) connected to the output of receiver 941 and a microphone (not shown) connected to the input of transmitter 943. A portable radio adapted to communicate both alphanumeric information and voice signals is described in the instant assignee's co-pending U.S. patent application Ser. No. 323,644 (now U.S. Pat. No. 4,430,742), filed Nov. 20, 1981, entitled, "Data Muting Method and Apparatus for Radio Communications System", invented by Thomas A. Freeburg et al. and incorporated herein by reference.

In summary, unique methods and apparatus for transmitter selection and transmitter re-use in data communications systems has been described. By selecting the proper transmitter for transmitting message signals to portable radios, unnecessary transmissions are eliminated, freeing up the radio channel for communications with other portable radios. Moreover, transmitters which do not interfere with communications already underway to a particular zone can be simultaneously transmitting message signals to portable radios in other zones, thus greatly enhancing message signal throughput.

I claim:

1. A method for use in a primary station of a communications system communicating message signals via a communications medium between the primary station and a plurality of remote stations located anywhere in a geographical area, said primary station including control means and a plurality of base stations, each base station including transmitting means for transmitting message signals modulated on a first carrier signal and receiving means colocated with the transmitting means for re-eiving message signals modulated on a second carrier signal, and said remote stations including transmitting means for transmitting message signals modulated on the second carrier signal and receiving means for receiving message signals modulated on the first carrier signal; said method for selecting at least one of the base station transmitting means for transmitting message signals to a targe remote station, said method comprising the steps of:
   (a) measuring the signal strength of the carrier signal that is received by any of the base station receiving means from said target remote station during each transmission therefrom;
   (b) computing an estimate of the communications medium path loss between each base station receiving means and said target remote station using the measured signal strength for that base station receiving means;
   (c) computing an estimate of the signal strength receivable at said target remote station from each base station transmitting means using the computed path loss estimate for the base station receiving means colocated with that base station transmitting means; and
   (d) selecting at least one of the base station transmitting means having a computed receivable signal strength estimate that has a magnitude greater than a predetermined receive sensitivity threshold of said target remote station's receiving means.

2. The method according to claim 1, wherein said step c) further includes the step of weighting the computer receivable signal strength estimate of each base station transmitting means by a prioritization factor pre-selected for that base station transmitting means.

3. The method according to claim 1, further including the step of (e) modulating a message signal on the first carrier signal of the base station transmitting means selected in step (d).

4. The method according to claim 1, further including the step of (e) disabling those of the other base station transmitting means whose modulated first carrier signal would produce interference with the reception of a message signal by the target remote station.

5. The method according to claim 1, further including the steps of:
   (e) repeating steps (a), (b) and (c) for a second target remote station; and
   (f) selecting at least one of the other base station transmitting means that does not interfere with communications with the first target remote station and which has a computed receivable signal strength estimate that has a magnitude greater than the predetermined receive sensitivity threshold of the second target remote station receiving means.

6. The method according to claim 1, further including the steps of:
   (e) adjusting the computed receivable signal strength estimate of the selected base station transmitting means for the computed receivable signal strength estimate of all other active base station transmitting means allowed to simultaneously transmit message signals to other remote stations; and
   (f) after a predetermined time interval, modulating a message signal on the first carrier signal of the selected base station transmitting means if its adjusted receivable signal strength estimate does not have a magnitude greater than the predetermined receive sensitivity threshold of said target remote station's receiving means.

7. The method according to claim 1, further including the steps of:
   (e) adjusting the computed receivable signal strength estimate of the selected base station transmitting means for the computed receivable signal strength estimate of all other active base station transmitting means allowed to simultaneously transmit message signals to other remote stations; and
   (f) modulating a message signal on the first carrier signal of the selected base station transmitting means if the magnitude of its adjusted receivable signal strength estimates is greater than the predetermined receive sensitivity threshold of said target remote station's receiving means.

8. The method according to claim 1, wherein said step (d) further includes the step of selecting a second base station transmitting means having a computed receivable signal strength estimate that has a magnitude greater than the predetermined receive sensitivity threshold of the target remote station's receiving means; and said method further including the step of (e) modulating a message signal on the first carrier signal of the first selected base station transmitting means and thereafter on the first carrier signal of the second selected base station transmitting means.

9. The method according to claim 1, wherein said step (d) further includes the step of selecting a second base station transmitting means having a computed receivable signal strength estimate that has a magnitude greater than the predetermined receive sensitivity threshold of the target remote station's receiving means; and said method further including the step of (e) modulating a message signal on the first carrier signal of both the first selected base station transmitting means and the second selected base station transmitting means.

10. A method for use in a primary station of a communications system communicating message signals via a communications medium between the primary station and a plurality of remote stations located anywhere in a geographical area, said primary station including control means and a plurality of base stations, each base station including transmitting means for transmitting message signals modulated on a first carrier signal and receiving means colocated with the transmitting means for receiving message signals modulated on a second carrier signal, and said remote stations including transmitting means for transmitting message signals modulated on the second carrier signal and receiving means for receiving message signals modulated on the first carrier signal; said method for selecting at least one of the base station transmitting means for transmitting message signals to a target remote station, said method comprising the steps of:
   (a) measuring the signal strength of the carrier signal that is received by any of the base station receiving means from said target remote station during each transmission therefrom;
   (b) computing an estimate of the communications medium path loss between each base station receiving means and said target remote station using the measured signal strength for that base station receiving means;
   (c) computing an estimate of the signal strength receivable at the target remote station from each base station transmitting means using the computed path loss estimate for the base station receiving means colocated with that base station transmitting means;
   (d) for each base station transmitting means, adjusting its computed receivable signal strength estimate for the computed receivable signal strength estimate of all other base station transmitting means allowed to simultaneously transmit message signals to other remote stations; and
   (e) selecting at least one of the base station transmitting means having an adjusted receivable signal strength estimate that has a magnitude greater than a predetermined capture threshold of the target remote station's receiving means.

11. The method according to claim 10, wherein said step (d) further includes the step of weighting the adjusted receivable signal strength estimate of each base station transmitting means by a prioritization factor pre-selected for that base station transmitting means.

12. The method according to claim 11, wherein said weighting step includes the step of weighting the adjusted receivable signal strength estimate of each base station transmitting means by a second prioritization factor preselected for that base station transmitting means to produce a second adjusted receivable signal strength estimate, the first and second adjusted receivable signal strength estimate for each base station transmitting means corresponding to first and second communications medium reuse states for that base station transmitting means.

13. The method according to claim 10, further including the step of (f) modulating a message signal on the first carrier signal of the base station transmitting means selected in step (e).

14. The method according to claim 10, further including the step of (f) disabling those of the other base station transmitting means whose modulated first carrier signal would produce interference with the reception of a message signal by the target remote station.

15. The method according to claim 10, further including the steps of:
(f) repeating steps (a), (b), (c) and (d) for a second target remote station; and
(g) selecting at least one of the other base station transmitting means that does not interfere with communications with the first target remote station and which has a computed receivable signal strength estimate that has a magnitude greater than the predetermined capture threshold of the second target remote station receiving means.

16. The method according to claim 10, wherein said step (e) further includes the step of selecting a second base station transmitting means having a computed receivable signal strength estimate that has a magnitude greater than the predetermined capture threshold of the target remote station's receiving means; and said method further including the step of (f) modulating a message signal on the first carrier signal of the first selected base station transmitting means and thereafter on the first carrier signal of the second selected base station transmitting means.

17. The method according to claim 10, wherein said step d) further includes the step of selecting a second base station transmitting means having a computed receivable signal strength estimate that has a magnitude greater than the receive sensitivity threshold of the target remote station's receiving means; and said method further including the step of (e) modulating a message signal on the first carrier signal of both the first selected base station transmitting means and the second selected base station transmitting means.

18. A method of maximizing reuse of base stations for substantial simultaneous communications via a communications medium between two or more base stations and different remote stations associated therewith, each base station including transmitting means for transmitting message signals modulated on a first carrier signal and receiving means colocated with the transmitting means for receiving message signals modulated on a second carrier signal, and said remote stations including transmitting means for transmitting message signals modulated on the second carrier signal and receiving means for receiving message signals modulated on the first carrier signal; for each transmission from a remote station, said method comprising the steps of:
(a) measuring the signal strength of the carrier signal that is received by any of the base station receiving means from said remote station during each transmission therefrom;
(b) computing an estimate of the communications medium path loss between each base station receiving means and said remote station using the measured signal strength for that base station receiving means;
(c) computing an estimate of the signal strength receivable at said remote station from each base station transmitting means using the computed path loss estimate for the base station receiving means colocated with that base station transmitting means; and
(d) allowing an inactive base station transmitting means to transmit a message signal to said remote station if its computed receivable signal strength estimate adjusted for the computed receivable signal strength estimate of all active base station transmitting means is greater than a predetermined capture threshold of said remote station's receiving means.

19. Control means for a primary station of a communications system communicating message signals via a communications medium between the primary station and a plurality of remote stations located anywhere in a geographical area, said primary station further including a plurality of base stations, each base station including transmitting means for transmitting message signals modulated on a first carrier signal and receiving means colocated with the transmitting means for receiving message signals modulated on a second carrier signal, and said remote stations including transmitting means for transmitting message signals modulated on the second carrier signal and receiving means for receiving message signals modulated on the first carrier signal; said control means comprising:
means for measuring the signal strength of the carrier signal that is received by any of the base station receiving means from a remote station during each transmission therefrom;
means for computing an estimate of the communications medium path loss between each base station receiving means and said remote station using the measured signal strength for that base station receiving means;
means for computing an estimate of the signal strength receivable at said remote station from each base station transmitting means using the computed path loss estimate for the base station receiving means colocated with that base station transmitting means; and
means for selecting at least one of the base station transmitting means having a computed receivable signal strength estimate that has a magnitude greater than a predetermined receive sensitivity threshold of said remote station's receiving means.

20. The control means according to claim 19, wherein said signal strength computing means further includes means for weighting the computed receivable signal strength estimate of each base station transmitting means by a prioritization factor pre-selected for that base station transmitting means.

21. The control means according to claim 19, further including means for disabling those of the other base station transmitting means whose modulated first carrier signal would produce interference with the recognition of the message signal by the selected remote station.

22. The control means according to claim 19, further including means for modulating a message signal on the first carrier signal of the selected base station transmitting means.

23. Control means for a primary station of a communications system communicating message signals via a communications medium between the primary station and a plurality of remote stations located anywhere in a geographical area, said primary station including control means and a plurality of base stations, each base station including transmitting means for transmitting message signals modulated on a first carrier signal and receiving means colocated with the transmitting means for receiving message signals modulated on a second carrier signal, and said remote stations including transmitting means for transmitting message signals modulated on the second carrier signal and receiving means for receiving message signals modulated on the first carrier signal; said control means comprising:
- means for measuring the signal strength of the carrier signal that is received by any of the base station receiving means from a remote station during each transmission therefrom;
- means for computing an estimate of the communications medium nath loss between each base station receiving means and said remote station using the measured signal strength for that base station receiving means;
- means for computing an estimate of the signal strength receivable at said remote station from each base station transmitting means using the computed path loss estimate for the base station receiving means colocated with that base station transmitting means;
- means for adjusting the computed receivable signal strength estimate of each base station transmitting means for the computed receivable signal strength estimate of all other base station transmitting means allowed to simultaneously transmit message signals to other remote stations; and
- means for selecting at least one of the base station transmitting means having an adjusted receivable signal strength estimate that has a magnitude greater than a predetermined capture threshold of said remote station's receiving means.

24. The control means according to claim 23, wherein said signal strength computing means further includes means for weighting the adjusted receivable signal strength estimate of each base station transmitting means by a prioritization factor pre-selected for that base station transmitting means.

25. The control means according to claim 23, further including means for disabling those of the other base station transmitting means whose modulated first carrier signal would produce interference with the recognition of the message signal by the selected remote station.

26. The control means according to claim 23, further including means for modulating a message signal on the first carrier signal of the selected base station transmitting means.

27. Control means for maximizing reuse of base stations for substantially simultaneous comunications via a communications medium between two or more base stations and different remote stations associated therewith, each base station including transmitting means for transmitting message signals modlated on a first carrier signal and receiving means colocated with the transmitting means for receiving message signals modulated on a second carrier signal, and said remote stations including transmitting means for transmitting message signals modulated on the second carrier signal and receiving means for receiving message signals modulated on the first carrier signal; and control means comprising:
- means for measuring the signal strength of the carrier signal that is received by any of the base station receiving means from a remote station during each transmission therefrom;
- means for computing an estimate of the communications medium path loss between each base station receiving means and said remote station using the measured signal strength for that base station receiving means;
- means for computing an estimate of the signal strength receivable at said remote station from each base station transmitting means using the computed path loss estimate for the base station receiving means colocated with that base station transmitting means; and
- means for allowing an inactive base station transmitting means to transmit a message signal to said remote station if its computed receivable signal strength estimate adjusted for the computed receivable signal strength estimate of all active base station transmitting means is greater than a predetermined capture threhold of said remote station's receiving means.

* * * * *

UNITED STATES PATENT AND TRADEMARK OFFICE
CERTIFICATE OF CORRECTION

PATENT NO. : 4,670,906

DATED : June 2, 1987

INVENTOR(S) : Stuart W. Thro

It is certified that error appears in the above-identified patent and that said Letters Patent is hereby corrected as shown below:

Column 20, line 37, change the word "re-eiving" to --receiving--.

Column 20, lines 67 & 68, change the word "computer" to --computed--.

Column 21, line 49, change the word "estimates" to --estimate--.

Column 23, line 29, change the letter "d)" to --e)--; line 32, change the words "receive sensitivity" to --predetermined capature--; line 34, change the letter "e)" to --f)--.

Column 25, line 11 change the word "nath" to --path--.

Column 26, line 12, change the word "modlated" to --modulated--.

Signed and Sealed this

Twenty-seventh Day of October, 1987

Attest:

DONALD J. QUIGG

Attesting Officer

Commissioner of Patents and Trademarks